(Model.)
L. GOODYEAR.
TWINE HOLDER AND CUTTER.
No. 394,168. Patented Dec. 11, 1888.
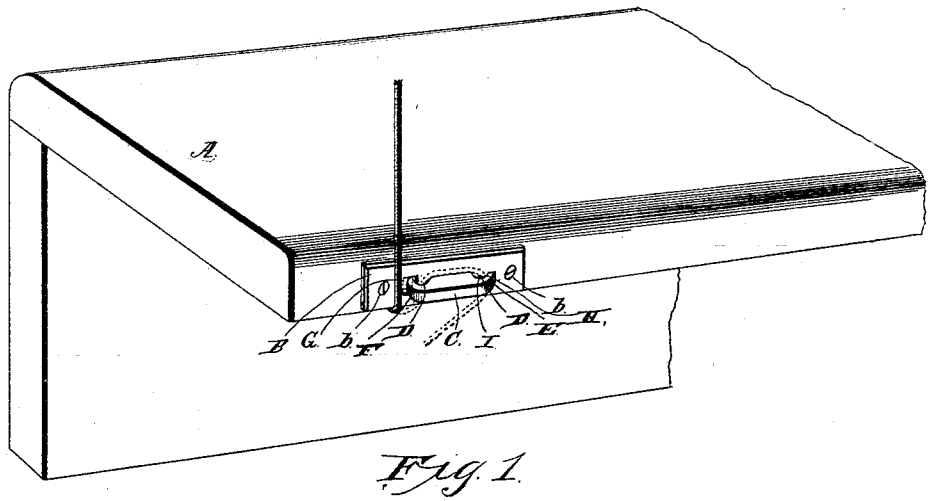
Fig. 1
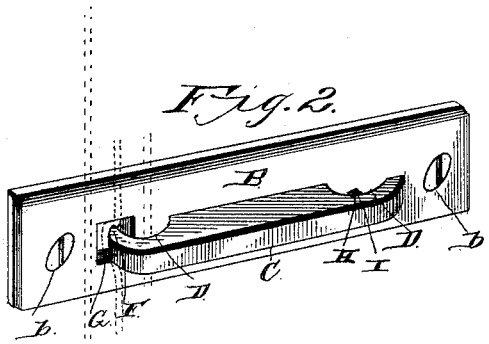
Fig. 2
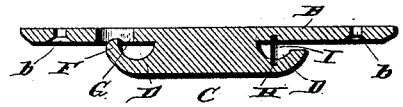
Fig. 3
Fig. 4
Witnesses
Geo. J. Pope.
R. W. Bishop.
Inventor,
L. Goodyear.
By his Attorneys.

UNITED STATES PATENT OFFICE.

LEWIS GOODYEAR, OF TRUMANSBURG, NEW YORK.

TWINE HOLDER AND CUTTER.

SPECIFICATION forming part of Letters Patent No. 394,168, dated December 11, 1888.

Application filed July 17, 1888. Serial No. 280,185. (Model.)

*To all whom it may concern:*

Be it known that I, LEWIS GOODYEAR, a citizen of the United States, residing at Trumansburg, in the county of Tompkins and State of New York, have invented new and useful Improvements in Twine Holders and Cutters, of which the following is a specification.

My invention relates to improvements in twine holders and cutters; and it consists in certain novel features, hereinafter described and claimed.

In the accompanying drawings, Figure 1 is a perspective view of a counter having my improved device secured thereto. Fig. 2 is a perspective view of the twine holder and cutter detached, showing in dotted lines the various positions of the cord as it is being inserted. Fig. 3 is a horizontal longitudinal section of the device, and Fig. 4 is a detail view of the cutter.

Referring to the drawings particularly by letter, A designates a store-counter, which may be of any desired size or construction, and beneath which is secured a suitable box or other receptacle for supporting the ball of twine.

B designates a base-plate, of suitable size and material, provided near its opposite ends with the countersunk transverse openings $b$, through which retaining-screws are passed to secure the device to a counter, as shown in Fig. 1. From the outer face of the base-plate, at the center of the same, projects a block, C, which extends longitudinally along the base-plate and has its ends detached therefrom, the right-hand end, E, being slightly above the same, as clearly shown in Figs. 2 and 3. The said ends are made convex, as shown, so as to present no sharp corners or other obstructions liable to catch in the clothes of an attendant. Both ends of the block are provided with semicircular recesses D on their rear sides, as shown, and the left-hand end, F, projects slightly into a recess or opening, G, in the base-plate.

H designates the cutter, consisting of a pin, I, secured transversely between the base-plate and the right-hand end of the block C. This pin is angular in cross-section, the edges being sharpened and projecting downward and outward.

In practice the device is secured to the edge of the counter, as shown and described, and the ball of twine is placed in and supported by a suitable receptacle secured beneath the counter. The end of the twine is then held in a vertical position, as shown in Fig. 1, and, being drawn against the left-hand end of the block C, will slip past or over the same and through the aperture in the base-plate into the recess in the rear side of the block. The extremity of the cord being then allowed to fall, will drop over the end of the block in front of the same, being thereby held within convenient reach of the operator or attendant at all times. When it is desired to tie a package, the twine is drawn out and wrapped around the bundle in the usual manner, and after being secured is drawn against the cutter, as indicated by dotted lines in Fig. 1, thereby severing the cord, the end falling over the block in the manner before described.

It will be observed that my device is very simple and can be manufactured at a slight cost, and by reason of its small size can be secured to the counter without in any way interfering with the movements of the attendant.

Having thus described my invention, what I claim, and desire to secure by Letters Patent, is—

1. The improved twine holder and cutter, comprising a base-plate provided with an aperture, a longitudinal block projecting from the base-plate and having its ends provided with recesses on its inner side, one of said ends projecting slightly into the aperture in the base-plate, and a cutting-pin secured transversely between the other end of said block and the base-plate, the said end terminating above the base-plate so as to leave a space between the said plate and the end of the block, as set forth.

2. The twine-cutter comprising the base-plate, the block projecting therefrom and arranged parallel to said plate and having an open end, and the transverse pin secured between the open end of the block and the plate, said pin being angular in cross-section and having its edges sharpened, as set forth.

In testimony that I claim the foregoing as my own I have hereto affixed my signature in presence of two witnesses.

LEWIS GOODYEAR.

Witnesses:
H. L. DAVENPORT,
C. L. CHAPMAN.